Figure 1:
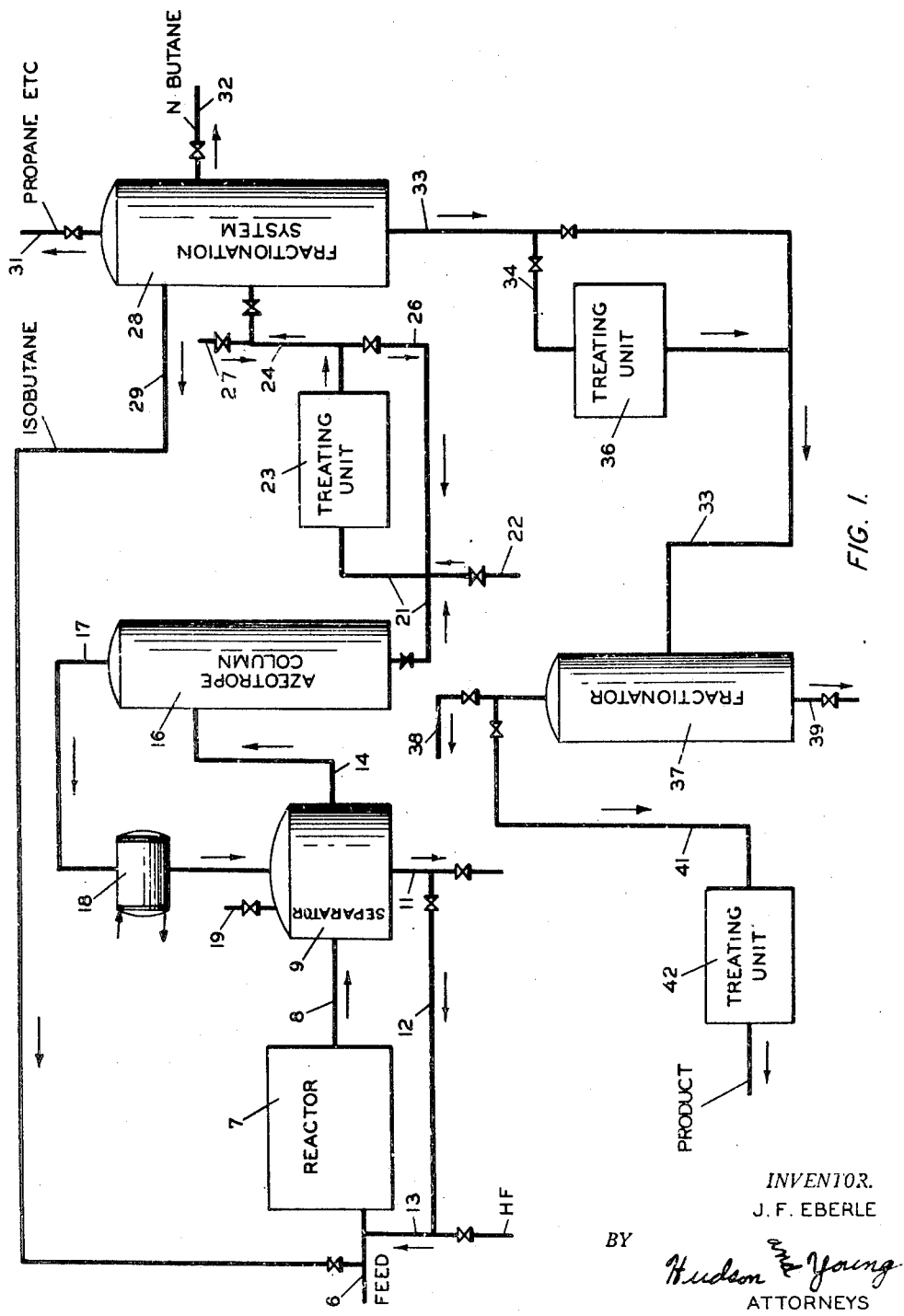

Sept. 6, 1949.  J. F. EBERLE  2,481,207
METHOD OF DEHYDROFLUORINATION WITH
COPPER PLATED METAL CATALYSTS
Filed July 9, 1945  2 Sheets-Sheet 2

INVENTOR
J. F. EBERLE
BY Hudson & Young
ATTORNEYS

Patented Sept. 6, 1949

2,481,207

UNITED STATES PATENT OFFICE 2,481,207

METHOD OF DEHYDROFLUORINATION WITH COPPERPLATED METAL CATALYSTS

Jack F. Eberle, Bartlesville, Okla., assignor to Phillips Petroleum Company, a corporation of Delaware Application July 9, 1945, Serial No. 603,837

11 Claims. (Cl. 260—683.4)

This invention relates to the treatment of hydrocarbons. In one particular aspect, this invention relates to the removal of organically combined fluorine from a hydrocarbon effluent of an alkylation process using a fluorine-containing catalyst. More particularly, in this aspect this invention relates to the conversion of organic fluorine compounds to hydrogen fluoride and the corresponding hydrocarbon radical, and the recovery of hydrogen fluoride thus liberated.

In the manufacture of hydrocarbons by processes in which a fluorine-containing catalyst is used, small proportions of organic fluorine-containing by-products are formed. These processes may involve such reactions as polymerization, isomerization and alkylation of relatively low-boiling hydrocarbon to produce motor fuel having a high octane quality, and are effected in the presence of catalysts comprising one or more of such inorganic fluorine compounds as hydrofluoric acid, boron trifluoride and the like. Although the exact nature or composition of these organic fluorine-containing by-products has not been definitely established, they are believed to be predominantly alkyl fluorides and/or aryl fluorides. These fluorides are not completely removed by washing the hydrocarbon mixtures in which they are contained with alkaline solutions such as aqueous solutions of sodium hydroxide or sodium carbonate. For the most part, these organic fluorine compounds have boiling points which are not substantially higher than the several reactants used in the conversion process. However, some of the organic fluorine compounds do have higher boiling points than the reactants and the boiling points of the higher-boiling fluorides correspond to the boiling points of the conversion products. As a result, these organic fluorine compounds will be found in the various hydrocarbon fractions in subsequent separation process for separating and refining the products, and in many instances the organic fluorine compounds tend to accumulate in the various high-boiling hydrocarbon fractions. These fluorides tend to decompose at elevated temperatures, such as those employed in fractional distillation of the hydrocarbon mixture, thereby forming hydrofluoric acid which is corrosive, especially in the presence of moisture. In gaseous mixtures of hydrocarbons they may thus cause corrosion of treating equipment; in liquid hydrocarbon mixtures, and especially motor fuels, they are undesirable for similar reasons that are obvious.

Consequently, it is highly desirable and often essential to minimize the accumulation of the organic fluorine compounds, or to remove them from the hydrocarbon effluent of such processes as described. Various methods have been used to remove the organic fluorine compounds from the hydrocarbon effluent. For example, in the alkylation of low-boiling paraffins in the presence of a hydrofluoric acid alkylation catalyst the alkylation effluent is passed to a separator wherein a liquid hydrocarbon-rich phase and a liquid hydrogen fluoride-rich phase are formed. The liquid hydrocarbon-rich phase is passed from the separator to a distillation column wherein dissolved hydrogen fluoride is removed as an overhead azeotropic mixture. The bottom fraction contains the alkylate product and also minor proportions of organic fluorine compounds which are undesirable as previously mentioned. In the usual practice this bottom fraction from this distillation is treated to remove the organic fluorine compounds. Such treatments comprise contacting the bottom fraction with a suitable absorption material which selectively absorbs the organic fluorine compounds, or contacting the bottom fraction with a catalytic defluorinating agent which converts the organic fluorine compound to hydrogen fluoride and the corresponding organic radical. Various other treatments which involve essentially the use of catalytic agents in connection with fractional distillation etc. have been used in removing the organic fluorine compound and in thus rendering the hydrocarbon fraction substantially non-corrosive. However, in these treatments it is very difficult, if not impossible, to remove absolutely or even substantially all of the organic fluorine compounds, because in the case of absorbents the absorption power decreases and in the case of catalysts the equilibrium of the decomposition reaction must be considered. As a result of some of the fluorine compounds, especially the high-boiling organic fluorine compounds, remaining in the hydrocarbon fraction, the hydrocarbon stream becomes corrosive when the organic fluorine compounds accumulate in the bottom fractions from various fractional distillations subsequent to the organic fluorine compound-removal process. Therefore, it is much to be desired to provide a method for removing substantially all of the organic fluorine compounds from the hydrocarbon stream in order to prevent corrosion of subsequent equipment by concentration of the organic fluorine compounds in the bottom fractions in the various fractional distillations.

Moreover, since the fluorine combined as the organic fluoride represents, over a period of time, a substantial loss of hydrofluoric acid catalyst in a conversion process such as alkylation, the recovery of the fluorine as hydrogen fluoride would amount to a substantial saving in costs of operation and material.

An object of this invention is to effect substantially complete removal of organic fluorine compounds from organic mixtures containing the same.

A further object of this invention is to provide an improved process for obtaining a substantially fluorine-free alkylate from a process for the alkylation of low-boiling hydrocarbons in the presence of a fluorine-containing alkylation catalyst.

Another object of this invention is to recover fluorine combined as organic fluorine compounds which are by-products of an alkylation process as free hydrogen fluoride to be recycled to the alkylation process as a catalyst therefor.

Still another object of this invention is to remove dissolved hydrogen fluoride from a hydrocarbon mixture containing the same.

It is a further object of this invention to increase the efficiency of a defluorinating catalyst for the removal of organic fluorine compounds from a hydrocarbon effluent of a hydrocarbon conversion process.

Another object of this invention is to decompose organic fluorine compounds to liberate hydrogen fluoride and the corresponding organic radical.

Other objects and advantages of this invention will become apparent to those skilled in the art from the accompanying disclosure and description.

In accordance with this invention, organic fluorine compounds can be substantially removed from an organic mixture containing the same by contacting the organic mixture with a suitable catalytic agent which decomposes the organic fluorine compound to liberate hydrogen fluoride and with a suitable sorption medium which is capable of sorbing the liberated hydrogen fluoride. In contacting the organic mixture containing an organic fluorine compound, the organic fluorine compound is decomposed into hydrogen fluoride and the corresponding organic radical. The decomposition of the organic fluorine compound is an equilibrium reaction, as evidenced by the following typical reaction equation:

Alkyl fluoride⇌Olefin+HF

Once such an equilibrium is established in the presence of a catalyst no further decomposition of the organic fluorine compound takes place unless one of the products of decomposition is removed, such as the olefin or the hydrogen fluoride. If one or both of the decomposition products are removed, the decomposition reaction of the organic fluorine compound will proceed to completion and thus decompose substantially all of the organic fluorine compound. Consequently, the organic mixture containing the organic fluorine compound is contacted with a suitable sorption medium either simultaneously or subsequently to contact with the catalytic defluorinating agent. The removal of the hydrogen fluoride by the sorption medium upsets the decomposition equilibrium and permits further catalytic decomposition of the organic fluorine compound.

In the preferred embodiment of the present invention, the organic mixture containing the organic fluorine compound is passed through a treating zone containing both a powdered or granular catalytic defluorinating agent and a hydrogen fluoride-sorption medium. This treating zone is usually arranged in such a manner that the catalyst and the sorption medium are in alternate layers. By such an arrangement the first catalytic layer establishes the equilibrium decomposition reaction and the subsequent sorption layer upsets this equilibrium by removing liberated hydrogen fluoride; then the next catalytic layer reestablishes the decomposition equilibrium by decomposing at least a portion of the remaining organic fluorine compound. Each following catalytic and sorption layer acts in a similar manner until substantially all of the organic fluorine compound is decomposed. A similar embodiment, which may also be practiced, is the arrangement of the catalyst and sorption medium in successive zones rather than in a single zone; thus, the catalyst will be maintained in one separate zone or column and the sorption medium will be maintained in a second and successive zone or column, through which the organic mixture passes, respectively. Still another arrangement may be followed by supporting alternate layers of catalyst and sorption medium in a sorption column in such a manner that free space exists between the supported layers. This arrangement is especially desirable since the tendency for channelling of the liquid hydrocarbon stream through the powdered or granular contact material is minimized. The number of layers or zones which will be suitable for removal of the organic fluorine compound depends upon several factors such as the type of catalytic agent, the type of sorption medium, the conditions of temperature and pressure, and the depth of the catalytic and sorption beds; but such conditions and the number of successive layers or zones may be easily determined by trial. In general, about 3 to about 6 inch depth layer of catalyst and sorption material will be sufficient when from about 10 to about 25 layers are used in the treating zone.

In a somewhat less preferred embodiment of the present invention the catalyst and sorption medium may be admixed together in a treating zone in a more or less uniform manner and the organic mixture contacted with the uniform mixture of catalyst and sorption medium. The arrangement of alternate layers of separate zones for each contact material is preferred in order to facilitate recovery of the sorbed hydrogen fluoride, if desired; and also since the contact of liberated hydrogen fluoride with the metallic catalyst substantially decreases the catalytic activity thereof by the conversion of the hydrogen fluoride to the corresponding metallic fluoride. Such conversion to the metallic fluoride consumes both the catalyst and the hydrogen fluoride so as to decrease the activity of the catalyst and hinder the recovery of hydrogen fluoride.

In particular, an especially novel and useful catalyst which is preferred for carrying out this invention has been found to be copperplated iron in the form of filings, granules, beads, etc. Such iron granules or filings are treated with hydrochloric or sulfuric acid prior to plating, and are washed free of the acid. Thereafter, the iron filings are treated with copper sulfate under conditions to copperplate the iron and render the resulting catalyst particularly effective in accomplishing a quick decomposition reaction of the organic fluorine compound. Various other metals may be copperplated in a similar manner and rendered particularly active catalysts for decomposing the organic fluorine compounds.

Other defluorinating catalysts which have been found suitable for practicing this invention can be prepared by treating various oxides of metals, such as aluminum, titanium, zirconium, hafnium, thorium, vanadium, chromium, molybdenum, tungsten, uranium, manganese, iron, cobalt, and nickel, with hydrogen fluoride or with a material which will release hydrogen fluoride under conditions used for treating the metal oxide. An especially desirable catalyst results from treating a more or less hydrous oxide of aluminum with hydrogen fluoride at a suitable temperature. The various natural occurring oxides such as bauxite, limonite, manganite, baddeleyite, brookite, brucite, diaspore, dysanalite, gibbsite, goethite, hausmannite, huebnerite, ilmenite, lepidocrocite, rutile, spinel, valentinite, etc., may also be treated in a similar manner to produce a suitable defluorinating catalyst. It is generally desirable when using the natural oxides to choose an oxide relatively free from susbtantial amounts of silica, although minor amounts are not deleterious. Fluorides of the metal of Group II of the Periodic Table in combination with a fluoride of a metal of the calcium group generally known as the alkaline earth metals and including calcium, strontium, and barium are also active defluorinating catalysts. Such metals and compounds as aluminum, phosphor iron, ferro chrome, ferro molybdenum, and ferro manganese are useful catalysts in quickly establishing equilibrium decomposition of the organic fluorine compounds. Various other catalysts which are known to those skilled in the art for decomposing organic fluorine compounds may be used as the catalytic agent in practicing the present invention without departing from the scope of this invention.

Adsorption materials which have been found suitable for selectively adsorbing hydrogen fluoride from an organic mixture have been found to comprise charcoal, dehydrated bauxite, granular metal oxides such as alumina, chromium oxide, and dehydrated metal oxide gels and the like. Materials which are capable of absorbing hydrogen fluoride and which involve a chemical reaction to form a decomposable salt are especially desirable. Such absorbent materials may comprise fluorides of the alkali and alkaline earth metals, such as sodium fluoride or potassium fluoride, which form the addition compound of the type NaF·HF. If desired, the hydrogen fluoride may be recovered from the double salt by heating directly or by passing hot gases over the absorption medium. Nitrogen bases and metal salts that form acid fluorides are also suitable for absorption of the liberated hydrogen fluoride.

Obviously both the catalyst and sorption medium may be supported on various inert materials well known to those skilled in the art without departing from the scope of this invention.

In practicing the preferred embodiment of this invention for the removal of organic fluorine compounds from a predominantly hydrocarbon mixture, the temperature of the treating zone is from about 100° F. to about 400° F. or higher, preferably about 200 to about 300° F., and the pressure is from about 100 to about 600 pounds per square inch gage, preferably from about 200 to about 450 pounds per square inch gage. A suitable space velocity in liquid volumes of organic mixture per volume of catalyst per hour is from about 1 to about 10, and preferably from about 2 to about 3. As previously described, if the catalyst and sorption medium are arranged in layers, the thickness of the layers may be from about 3 to about 6 inches and the number of layers may be about 10 to about 25; the actual thickness and number of layers will depend upon the conditions of operation and upon the particular catalyst and sorption medium used. Such conditions set forth above are not limiting to the scope of this invention, but are those which have been found preferable in general for removing substantially all of the organic fluorine compounds from the organic mixture without effecting extensive chemical changes in the organic mixture itself. Various other conditions may be found appropriate by trial.

In the case where the catalytic agent and the sorption medium are in separate zones or columns somewhat different conditions of temperature, pressure, etc. may be used for each column during defluorination. Thus, relatively high temperatures and low pressures may be used in the catalyst zone, while relatively low temperatures and high pressures may be used in the sorption zone. However, due to economic reasons it may be more desirable to maintain substantially the same conditions in both the catalytic and sorption zones.

The sorbed hydrogen fluoride is recovered from the sorption medium and the sorption medium regenerated by direct heating or passing hot gases such as air, steam, hydrocarbons, etc. through the treating zone. The heating process not only regenerates the sorption medium, but also may activate the catalytic defluorinating agent when the sorption medium and catalytic agent are contained in the same zone. In case the sorption medium is a non-reactive material which adsorbs the liberated hydrogen fluoride such as charcoal, this material may be regenerated by passing superheated steam or other hot gases, such as butane, at a temperature from about 400 to about 800° F., preferably about 500 to 600° F., and at approximately atmospheric pressure through or in contact with the adsorption medium. When a material, such as sodium or potassium fluoride which forms an additive compound with the liberated hydrogen fluoride, is used as the absorption medium, the temperature of the renegerating gas, such as air, steam, butane, etc., is from about 500 to about 1000° F., preferably from about 600 to about 700° F., and the pressure is approximately atmospheric. It may be preferred to operate the regeneration cycle at the same pressure as the sorption cycle, and thus the use of elevated pressure for regeneration are within the scope of this invention. Regeneration of the sorption memium may be accomplished also by heating the sorption medium directly without passing a hot gas through the medium. Upon heating the sorption medium during regeneration, whether by direct means or by the use of hot gases, vaporous hydrogen fluoride is liberated which may be recovered by methods familiar to those skilled in the art. In particular, when a regenerating gas, such as butane, is used, the hydrogen fluoride may be recovered from the resulting gaseous mixture by condensing the gaseous mixture and fractionally distilling the condensate to recover the hydrogen fluoride.

Although this invention can be applied with advantage in many modifications, particularly benefits of it have been realized in connection with the alkylation of low-boiling isoparaffins with low-boiling olefins in the presence of a fluorine-containing alkylation catalyst. It is believed that the principles of this invention may be adequately illustrated by the discussion of a specific modification in connection with the accompanying Figures 1, 2 and 3 which form a part of this application, and which illustrate diagrammatically an arrangement of apparatus suitable for practicing this invention in connection with such an alkylation process.

Referring to Figure 1, a suitable alkylation reaction zone is diagrammatically represented by element 7. An alkylation feed, comprising an isoparaffin and an olefin, is charged to reactor 7 through line 6. Such a feed may comprise a butane-butylene fraction or a butane-amylene fraction from a refinery. Typical examples of such alkylation feed fractions are shown in the following table:

| Component | Liquid Volume, Per Cent | | | | | |
|---|---|---|---|---|---|---|
| | A | B | C | D | E | F |
| Propane and Lighter | 0.8 | } 8.1 | { 0.2 | 0.5 | 0.6 | 0.7 |
| Isobutane | 9.6 | | 7.9 | 35.1 | 30.7 | 33.0 |
| Butylenes | 16.6 | 24.9 | 20.0 | 17.0 | 17.3 | 16.3 |
| Normal Butane | 22.4 | 28.2 | 22.7 | 34.4 | 37.9 | 35.6 |
| Amylenes | 13.7 | 13.9 | 15.0 | 4.8 | 5.0 | 4.6 |
| Pentanes | 36.5 | 24.8 | 33.9 | } 8.2 | 8.5 | 9.8 |
| Heavier | 0.4 | 0.1 | 0.3 | | | |
| | 100.0 | 100.0 | 100.0 | 100.0 | 100.0 | 100.0 |

A hydrofluoric acid alkylation catalyst, such as liquid hydrogen fluoride, is introduced into line 13 and the feed and catalyst may pass either together or separately into reactor 7, as desired. Generally the temperature of alkylation will be about 80 to about 100° F. and sufficient pressure will exist in reactor 7 to maintain the reactants in liquid phase. A hydrocarbon to acid ratio between about 1:1 and about 10:1 is preferred to obtain the appropriate alkylation of the isoparaffin. The ratio of isoparaffin to olefin in the reaction zone itself will be much larger than the ratio of isoparaffin to olefin in the feed as shown in the table above. The high ratio of isoparaffin to olefin is accomplished by recirculating a portion of the isoparaffin in the reaction zone; usually the ratio of isoparaffin to olefin in the reaction zone itself is 100:1 or higher.

From reactor 7 the resulting hydrocarbon alkylation effluent passes to separator 9 through line 8. In separator 9 a liquid hydrocarbon-rich phase is separated from a heavier liquid hydrogen fluoride-rich phase by gravity. The hydrogen fluoride-rich phase is withdrawn from separator 9 through line 11 and may be passed to a purification system (not shown) for removal of acid-soluble oils and water. After purification the hydrogen fluoride is returned to reactor 7 as a catalyst. If desired, all or a portion of the hydrogen fluoride-rich phase may be passed directly from separator 9 through lines 11, 12 and 13 to reactor 7. Make-up or fresh hydrogen fluoride is introduced into the system through line 13.

The hydrocarbon-rich phase from separator 9 contains some dissolved hydrogen fluoride and is therefore passed to an azeotropic distillation column 16 through line 14 to remove the hydrogen fluoride as an overhead product from the distillation zone. An azeotropic mixture of hydrogen fluoride and low-boiling hydrocarbons is removed from azeotrope column 16 through line 17 and passed through condenser 18 thence into separator 9 where it separates into a hydrocarbon-rich phase and a hydrogen fluoride-rich phase. The low-boiling hydrocarbons in the azeotropic mixture comprise propane, ethane, and some butanes. The bottom fraction from azeotrope column 16 comprises essentially unreacted isobutane, alkylate, some propane, and minor proportions of organically combined fluorine present as a by-product of the alkylation reaction. The organically combined fluorine comprises $C_4$ fluorides and lighter organic fluorides and lesser proportions of organic fluorine compounds heavier than $C_4$ fluorides.

Figure 3:
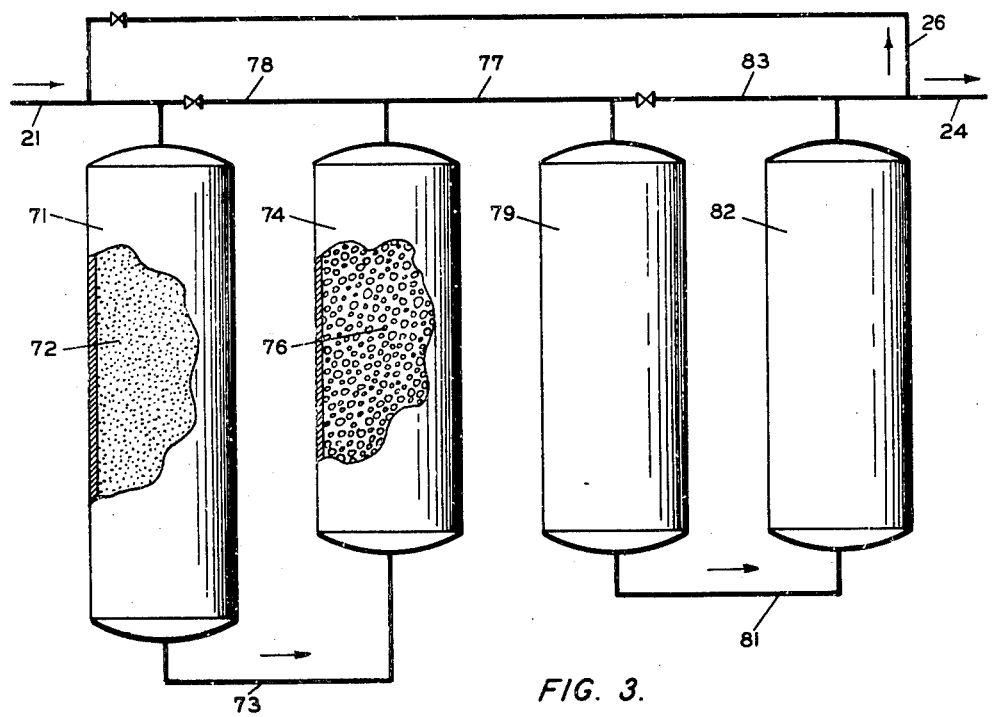

The bottom fraction is passed from azeotrope column 16 through line 21 to a treating unit 23 for removal of these organic fluorine compounds or a portion thereof. Treating unit 23 may comprise a single zone with alternate layers of an active defluorinating catalyst and a selective sorption medium as previously discussed and shown in Figure 2. Treating unit 23, on the other hand, may also be a series of successive columns alternately containing an active defluorinating catalyst and a sorption medium, as indicated in Figure 3. The quantity of organic fluorine in the bottom fraction from column 16, which passes to treating unit 23, is in general not more than about 0.1 per cent by weight of the hydrocarbon stream, and usually not more than about 0.001 to about .05 per cent.

Generally the operating conditions for removing the organic fluorine compounds in treating unit 23 by the process of this invention are such that the removal is effected in the liquid phase. However, vapor phase operation is within the scope of this invention. Liquid phase operation is preferred because lower temperatures of operation and smaller sized equipment may be used since the hydrocarbon stream is liquid. The use of pressures from about 200 to about 450 pounds per square inch gage and temperatures from about 200 to about 300° F. is preferred. Using these preferred pressures, a space velocity from about 2 to about 3 liquid volumes of hydrocarbon effluent per volume of catalyst per hour is adequate. Although various defluorinating catalysts may be used in carrying out this invention, a particularly novel catalyst, as previously described, and which is preferred as the catalytic defluorinating agent, comprises iron granules or filings which have been treated with concentrated sulfuric or hydrochloric acid and then subsequently copperplated with copper sulfate. This copperplated catalyst quickly brings about an equilibrium decomposition reaction of the organic fluorine compound to liberate free hydrogen fluoride. The particular method of preparing such catalyst is described hereinafter in the examples. Charcoal is a particularly suitable sorption medium and is the preferred sorption medium to be used in treating unit 23. When the bottom fraction of azeotrope column 16 is treated to defluorinate the same, preferably the conditions of operation are such that the $C_4$ fluorides and lighter organic fluorides are removed from the effluent leaving the heavier organic fluorine compounds in the hydrocarbon stream. These heavier organic fluorine compounds pass through subsequent fractional distillations and are removed with the bottom fractions of the distillations as hereinafter described. By removing only the $C_4$ and lighter fluorides mild conditions of operation can be used in treating unit 23 with a saving of equipment and material, since the catalyst life is longer and regeneration of the absorbent is less frequent. There is also less tendency for chemical changes to occur in the organic mixture being treated to remove the organic fluorine compounds. In operating in this preferred manner, the organic fluorine content of the effluent from treating unit 23 is about 0.002 to about 0.001 per cent by weight of the resulting effluent. A portion of the effluent from treating unit 23 may be recycled through line 26 and in this way the fluorine content may have decreased even more. If preferred, however, all or a large portion of the organic fluorine compounds may be removed from the hydrocarbon stream by treating unit 23.

As previously discussed, the sorption medium may be regenerated and the hydrogen fluoride recovered therefrom by direct heating or by passing a hot gas, such as air, steam, butane, etc., through the sorption medium. In a preferred embodiment of the present invention, the sorption medium, such as charcoal, is regenerated by passing butane at a temperature between about 500 and about 600° F. through lines 22 and 21 into treating unit 23 and withdrawing a resulting hydrogen fluoride-rich gas from the system through lines 24 and 27. The hydrogen fluoride may be separated from the butane in a conventional manner known in the art, such as by fractional distillation similar to that used to separate the hydrogen fluoride from the alkylation effluent of the present illustrated process. Since it is necessary to regenerate the sorption medium after a certain period of use, it will often be desirable to have several units for removing organic fluorine compounds in parallel so that while one unit is in process flow, another unit may be regenererated; thus, a continuous flow process is possible. If desired, therefore, treating unit 23 may comprise several units for removing organic fluorine compounds in parallel.

From treating unit 23 the resulting effluent passes through line 24 to fractionation system 28. Fractionation system 28 may comprise a series of fractional distillation columns for the separation of the various components of the hydrocarbon effluent and is diagrammatically represented by element 28. In fractionation system 28 isobutane is separated and then passed through line 29 to be recycled to reactor 7 as a portion of the feed thereto. Propane and lighter hydrocarbons which are separated from the heavier hydrocarbons may be removed from system 28 through line 31. Normal butane which is also separated from other hydrocarbons is removed from fractionation system 28 through line 32. The normal butane may be recovered as a product or may be isomerized (not shown) to isobutane and passed to reactor 7 as a portion of the feed. A relatively high-boiling fraction from system 28 comprising the alkylate product is passed to another fractionating column for the separation of light alkylate from heavy alkylate. This high-boiling fraction from fractionation system 28 is thus passed through line 33 to fractionator 37. A light alkylate is removed from fractionator 37 through line 38 as a product of the process; while a heavier alkylate is removed through line 39 as a by-product.

When treating unit 23 is operated in such a manner that only the $C_4$ fluorides and lighter fluorides are removed from the hydrocarbon effluent, the bottom fraction from element 28 is passed through line 33 and line 34 to a treating unit 36 for the removal of the heavy organic fluorine compounds. Treating unit 36 is similar in arrangement of catalyst and sorption medium to treating unit 23 and is operated in a similar manner to unit 23, but under somewhat more severe conditions. Since the heavy fluorides have concentrated in the high-boiling fraction, the percentage of organic fluorine compounds in the hydrocarbon stream at this point in the process will be appreciably higher than before removal of the various lower-boiling fractions from the hydrocarbon effluent in fractionation system 28. However, after being treated in treater 36, the resulting hydrocarbon stream will usually contain not more than about 0.005 per cent by weight organic fluorine. If the light alkylate product removed through line 38 contains appreciable amounts of organic fluorine compounds which have as yet not been removed by previous treating steps, this light alkylate may be freed of such organic fluorine compounds by passing the alkylate overhead through line 41 and treating unit 42 which is also similar to treating unit 23. The conditions of operation for treating unit 42 are also similar to those conditions of operation for treating unit 23. As a result of the treatment of the hydrocarbon stream, the light alkylate will contain about 0.0006 to about 0.0005 per cent organic fluorine by weight.

To prevent the build-up of excessive pressure in the alkylation system by the presence of propane and lighter hydrocarbons in the alkylation effluent, a small portion of these hydrocarbons may be vented from the system through line 19.

In the operation of such an alkylation system it is not necessary in all cases to have three treating units as shown in Figure 1. Treating unit 23 alone may be sufficient to remove the desired amount of organic fluorine compounds. On the other hand, in some cases treating unit 23 may be omitted and treating units 36 and 42 used instead. Where only a small amount of organic fluorine compounds are present in the hydrocarbon effluent from the alkylation reaction, and especially where these organic fluorine compounds are heavier than $C_4$ fluorides, it may be sufficient to provide a treating unit on line 41 for treating the light alkylate product without previous treatment of the hydrocarbon alkylation effluent. It is seen, therefore, that treating units may be located in various positions in the process, depending upon the requirements.

Figure 2:
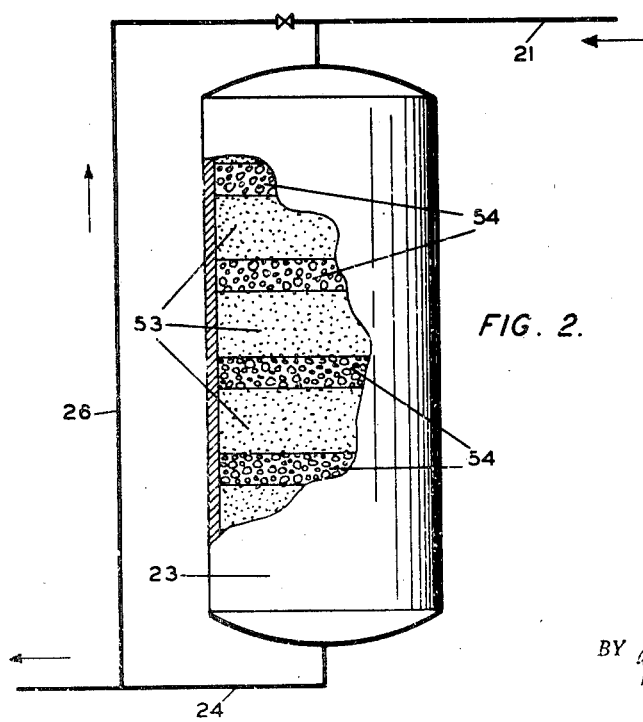

Figure 2 diagrammatically represents apparatus for an embodiment of treating unit 23, in which figure is shown alternate layers of defluorinating catalyst and sorption medium. The hydrocarbon effluent enters treating unit 23 through line 21 and is removed through line 24. A portion of the resulting effluent may be recycled through line 26. Numeral 53 of Figure 2 designates successive layers of a defluorinating catalyst, and numeral 54 designates successive layers of a sorption medium for removing liberated hydrogen fluoride.

Figure 3 diagrammatically represents another arrangement of apparatus for treating unit 23 in which the defluorinating catalyst and sorption medium are contained in separate columns. The hydrocarbon effluent passes through line 21 into column 71, which contains a defluorinating catalyst designated by numeral 72. The treated hydrocarbon effluent is withdrawn from column 71 through line 73 and is introduced into a second column 74 which contains a sorption medium designated by numeral 76 for removing liberated hydrogen fluoride. The effluent from column 74 is removed by line 77 and a portion thereof may be recycled to column 71 through line 78. The effluent from column 74 is passed to column 79 which contains a defluorinating catalyst, and the resulting effluent is removed therefrom through line 81. The effluent from column 79 is passed to column 82 which contains a sorption medium. The effluent from column 82 is removed by line 24 and a portion thereof may be recycled to column 79 through line 83. Any number of successive columns of defluorinating catalyst and sorption medium may be used; the number of columns will depend upon the requirements necessary for removing the desired amount of organic fluorine compounds from the hydocarbon effluent. A portion of the resulting effluent from the treating unit represented in Figure 3 may be recycled from line 24 through line 26 to line 21.

The following examples illustrate the operability of the present invention and also show the effectiveness of the preferred defluorinating catalysts for use in this invention.

Example I 300 grams of iron shavings were treated with concentrated sulfuric acid for 10 minutes; this treatment was followed by repeated decantation and water washing until the solution above the iron was only slightly acidic. The water was then drained off, and 250 ml. of a solution containing 0.20 gram of $CuSO_4 \cdot 5H_2O$ was added with vigorous shaking. After 5 minutes the solution was decanted, and the shavings were dried with two applications of acetone. Of the resulting catalyst, 185 cc. or 208.9 g. was divided into seven approximately equal parts that were placed in seven tubes. Charcoal was placed in eight similar tubes that were arranged alternately in series with the seven tubes of catalyst. The first charcoal tube was used to remove any free hydrogen fluoride from the feed. An acid-free hydrocarbon alkylation effluent comprising the bottom fraction of an azeotrope column of an alkylation process was passed, under sufficient pressure to maintain a liquid phase, through this arrangement of alternate tubes of catalyst and adsorption medium. The following results were obtained:

indicated by the 91 to 98 per cent removal of organic fluorine compounds. As a matter of explanation, the primary purpose of the treatment of the iron with a concentrated acid prior to copperplating is to cleanse and etch the surface of the iron in preparation for copperplating. The etched surface also provides an increased contact area on the catalyst.

Example II

A similar catalyst to that of Example I was prepared except that 0.600 grams of $CuSO_4 \cdot 5H_2O$ was used in plating the iron. This material was placed in a small iron tube of 163 ml. capacity without the sorption medium, and the following data were obtained with a part of the same feed as in Example I:

[Approximate temperature, 212° F. Liquid phase]

| Accumulated Time, hr. | Accumulated Volumes | Space Velocity, Liq. Vol./vol. cat./hr. | Fluorine in Feed | | Organic Fluorine in Effluent, weight, Per Cent | Fluorine Removed, Per Cent |
| --- | --- | --- | --- | --- | --- | --- |
| | | | Organic F, weight, Per Cent | Free HF, weight, Per Cent | | |
| 0 | 0 | | 0.0270 | 0.0000 | | |
| 13 | 31 | 1.9 | 0.0270 | 0.0000 | 0.0063 | 77 |
| 61 | 151 | 2.4 | 0.0260 | 0.0000 | 0.0120 | 58 |
| 90 | 167 | 1.3 | 0.0260 | 0.0000 | 0.0130 | 50 |

Comparison of these results (percentage removal of fluorine) with those given under Example I indicates that advantageously increased removal of organic fluorine compounds is obtained by using the arrangement of alternate contacting of the hydrocarbon effluent with catalyst and with sorption medium as in Example I than was obtained in the run described under Example II. It will be noted that as low as 50 per cent removal of organic fluorine compounds was obtained in Example II and the highest removal was only 77 per cent.

Example III

In another comparable run, iron shavings were treated with 10 per cent aqueous hydrogen chloride for 30 minutes, then washed with water and spread out to air-dry on absorbent paper for about 12 hours. The shavings thus treated were placed in a steel tube and were used to treat

[Approximate temperature, 250° F. Liquid phase]

| Accumulated Time, hr. | Accumulated Volumes of Liq. Effluent | Space Velocity, Liq. Vol./vol. cat./hr. | Fluorine in Feed | | Organic Fluorine in Effluent, weight, Per Cent | Fluorine Removed, Per Cent |
| --- | --- | --- | --- | --- | --- | --- |
| | | | Organic F, weight, Per Cent | Free HF, weight, Per Cent | | |
| 0 | 0 | | 0.0270 | 0.0000 | | |
| 19 | 42 | 2.2 | 0.0270 | 0.0000 | 0.0025 | 91 |
| 43 | 97 | 2.1 | 0.0270 | 0.0000 | 0.0005 | 98 |
| 68 | 154 | 2.2 | 0.0270 | 0.0000 | 0.0020 | 92 |

It will be noted that substantially complete removal of the organic fluorine was obtained, as azeotrope tower bottoms from an alkylation process with the following results:

[Approximate temperature, 212° F. Liquid phase]

| Accumulated Time, hr. | Accumulated Volumes | Space Velocity, Liq. Vol./vol. cat./hr. | Fluorine in Feed | | Organic Fluorine in Effluent, weight, Per Cent | Fluorine Removed, Per Cent |
| --- | --- | --- | --- | --- | --- | --- |
| | | | Organic F, weight, Per Cent | Free HF, weight, Per Cent | | |
| 18 | 11 | 0.6 | 0.0250 | 0.0000 | 0.0083 | 70 |
| 71 | 95 | 1.6 | 0.0280 | 0.0000 | 0.0131 | 53 |
| 90 | 125 | 1.7 | 0.0280 | 0.0000 | 0.0144 | 48 |
| 96 | 135 | 1.6 | 0.0280 | 0.0000 | 0.0170 | 39 |

These results, like those given under Example II, illustrate the relatively inefficient removal effected when an ordinary dehydrofluorination catalyst, such as iron, is used without the cooperating action of a hydrogen fluoride-absorption medium, as in Example II. Example III also shows that the copperplated catalysts are much superior to similar catalysts which have not been copperplated as indicated by the increased amount of organic fluorine compounds removed by the copperplated catalyst of Example II.

*Example IV*

To show the improvement brought about by my process of using alternate beds of defluorinating catalyst and sorption medium, 200 grams of iron shavings were treated with 10 per cent aqueous hydrogen chloride, washed with water, and dried with acetone. The shavings were then placed in several layers alternating with equal layers of charcoal in a tube. On passing azeotrope tower bottoms from an alkylation process through the tube, the following data were obtained:

[Approximate temperature, 250° F. Liquid phase]

| Accumulated Time, hr. | Accumulated Volumes | Space Velocity, Liq. Vol./vol. cat./hr. | Fluorine in Feed | | Organic Fluorine in Effluent, weight, Per Cent | Fluorine Removed, Per Cent |
| --- | --- | --- | --- | --- | --- | --- |
| | | | Organic F, weight, Per Cent | Free HF, weight, Per Cent | | |
| 18 | 107 | 1.7 | 0.0172 | 0.0020 | 0.0011 | 90 |
| 41 | 210 | 1.8 | 0.0172 | 0.0020 | 0.0006 | 96 |

It will be noted that by alternate contacting of catalyst and sorption medium, even when using an ordinary defluorinating catalyst as much as 90 to 96 per cent organic fluorine compounds were removed, as compared to 39 to 70 per cent in Example III. Here again, the treatment with acid solution serves to cleanse and etch the surface of the metal catalyst.

*Example V*

Butane at atmospheric pressure and about 500° F. was passed through the tubes containing the sorption medium to desorb and recover the hydrogen fluoride adsorbed by the charcoal adsorption medium. The amount of hydrogen fluoride recovered was determined by passing the effluent gas through an alkali scrubbing solution, which was titrated with standard acid. The following data were obtained:

HF adsorbed_____grams__ 2.14
HF recovered_____do____ 1.30
HF recovered_____per cent__ 61

Part of the hydrogen fluoride was found to be held very firmly by the charcoal, but upon a second regeneration at a slightly higher temperature as much as 92% of the hydrogen fluoride was recovered from the same charcoal.

As a possible explanation for the superiority of the copperplated metal catalysts, it is thought that some galvanic effect is set up on the surface of the catalyst by the presence of the copper film on the base metal, which effect renders the copperplated catalyst particularly effective in accomplishing a quick decomposition of the organic fluorine compound. Copper alone, although useful as a defluorinating catalyst, is not as effective for decomposition of the organic fluorine compound as the copperplated metal catalyst. This inferior quality of copper alone is probably the result of the absence of such a galvanic effect. Other metals above copper in the electrochemical series may be copperplated and as a result of which they act as superior defluorinating catalysts for decomposing organic fluorine compounds in a similar manner as copperplated iron. Examples of such copperplated metal catalysts are tin, aluminum, magnesium, etc.

Certain material disclosed but not claimed herein is claimed in a continuation-in-part, Serial Number 637,169, filed December 26, 1945.

Although this invention has been described with reference to alkylation in particular, and the examples have used particular catalysts, it is evident that the invention in general may be used in connection with various other processes for the removal of organic fluorine compounds from an organic mixture. Furthermore, various modifications of equipment, process of flow, and particular catalysts and the treatment thereof, may become obvious to those skilled in the art without departing from the scope of this invention.

I claim:

1. In a process for the alkylation of isobutane with an olefin in the presence of a hydrofluoric acid alkylation catalyst wherein organic fluorine compounds are formed as by-products of said alkylation and contaminate a hydrocarbon alkylation affluent, the method for removing said organic fluorine compounds which comprises separating said hydrocarbon alkylation effluent into a liquid hydrocarbon-rich phase and a liquid hydrofluoric acid-rich phase, passing said hydrocarbon-rich phase containing dissolved hydrofluoric acid and minor proportions of organic fluorine compounds to a fractional distillation and separating therein a relatively low-boiling fraction comprising substantially all of said dissolved hydrofluoric acid and a relatively high-boiling fraction containing organic fluorine compounds, passing said high-boiling fraction to a treating zone for removal of organic fluorine compounds from said fraction, said treating zone comprising a plurality of alternate layers of a defluorinating catalyst comprising copperplated iron and a hydrogen fluoride-adsorption medium comprising charcoal, maintaining a temperature between about 200 and about 300° F. and a pressure between about 200 and about 450 pounds per square inch gage in said treating zone, maintaining a space velocity in liquid volumes of the high-boiling fraction passing through said treating zone per volume of catalyst per hour between about 2 and about 3, and removing a resulting effluent substantially free from fluorine compounds from said treating zone.

2. In a process for the alkylation of isoparaffin with an olefin in the presence of a hydrofluoric acid alkylation catalyst wherein organic fluorine compounds are formed as by-products of said alkylation and contaminate a hydrocarbon alkylation effluent, the method for removing said organic fluorine compounds which comprises separating said hydrocarbon alkylation effluent into a liquid hydrocarbon-rich phase and a liquid hydrofluoric acid-rich phase, passing said hydrocarbon-rich phase containing dissolved hydrofluoric acid and minor proportions of organic fluorine compounds to a fractional distillation and separating therein a relatively low-boiling fraction comprising substantially all of said dissolved hydrofluoric acid and a relatively high-boiling fraction containing organic fluorine compounds, passing said high-boiling fraction to a treating zone for removal of organic fluorine compounds from said fraction, said treating zone comprising a plurality of alternate layers of a defluorinating catalyst comprising copperplated iron and a hydrogen fluoride-sorption medium, and removing a resulting effluent substantially free from fluorine compounds from said treating zone.

3. A process for treating a hydrocarbon material to remove organically combined fluorine therefrom, which comprises subjecting a hydrocarbon material containing a minor proportion of organically combined fluorine to the action of a copperplated iron catalyst which has been etched with sulfuric acid and treated with copper sulfate under conditions to copperplate the iron and render the resulting catalyst active in effecting decomposition of organically combined fluorine, maintaining said hydrocarbon material at a temperature between about 100 and about 400° F. and at a pressure between about 100 and about 600 pounds per square inch gage during contact with said catalyst, maintaining a space velocity in liquid volumes of hydrocarbon material per volume of catalyst per hour between about 1 and about 10, removing hydrogen fluoride liberated as a result of contact between said catalyst and hydrocarbon material from a resulting effluent, and recovering a hydrocarbon material substantially free from organically combined fluorine.

4. A process for treating a hydrocarbon material to remove organically combined fluorine therefrom, which comprises subjecting a hydrocarbon material containing organically combined fluorine to the action of copperplated iron, removing hydrogen fluoride liberated as a result of contact between said catalyst and hydrocarbon material from a resulting effluent, and recovering a hydrocarbon material substantially free from organically combined fluorine.

5. A process of defluorinating a hydrocarbon material containing organically combined fluorine which comprises contacting said hydrocarbon material with a catalyst comprising copperplated iron and subsequently sorbing the liberated hydrogen fluoride.

6. A process of defluorinating a hydrocarbon material containing organically combined fluorine which comprises successively contacting said hydrocarbon material with a plurality of bodies of defluorinating catalyst comprising copperplated iron and of hydrogen fluoride sorbent material, said bodies of catalyst and sorbent being disposed alternately.

7. A process according to claim 6 in which said alternate bodies of defluorination catalyst and sorbent material are alternate layers of from 3 to 6 inches in depth positioned with a defluorination zone.

8. In a process for the alkylation of isobutane with an olefin in the presence of a hydrofluoric acid alkylation catalyst wherein organic fluorine compounds are formed as by-products of said alkylation and contaminate a hydrocarbon alkylation effluent, the method for removing said organic fluorine compounds which comprises separating said hydrocarbon alkylation effluent into a liquid hydrocarbon-rich phase and a liquid hydrofluoric acid-rich phase, passing said hydrocarbon-rich phase containing dissolved hydrofluoric acid and minor proportions of organic fluorine compounds to a fractional distillation and separating therein a relatively low-boiling fraction comprising substantially all of said dissolved hydrofluoric acid and a relatively high-boiling fraction containing organic fluorine compounds, passing said high-boiling fraction to a treating zone for removal of organic fluorine compounds from said fraction, said treating zone comprising a plurality of alternate layers of a copperplated metal from the group of metals above copper in the electrochemical series and a hydrogen fluoride-sorption medium, and removing a resulting effluent substantially free from fluorine compounds from said treating zone.

9. In a process for the alkylation of isobutane with an olefin in the presence of a hydrofluoric acid alkylation catalyst wherein organic fluorine compounds are formed as by-products of said alkylation and contaminate a hydrocarbon alkylation effluent, the method for removing said organic fluorine compounds which comprises separating said hydrocarbon alkylation effluent into a liquid hydrocarbon-rich phase and a liquid hydrofluoric acid-rich phase, passing said hydrocarbon-rich phase containing dissolved hydrofluoric acid and minor proportions of organic fluorine compounds to a fractional distillation and separating therein a relatively low-boiling fraction comprising substantially all of said dissolved hydrofluoric acid and a relatively high-boiling fraction containing organic fluorine compounds, passing said high-boiling fraction to a treating zone for removal of organic fluorine compounds from said fraction, said treating zone comprising a plurality of alternate layers of copperplated iron and charcoal, and removing a resulting effluent substantially free from fluorine compounds from said treating zone.

10. A process for recovering free hydrogen fluoride from an organic fluorine compound contained in a predominantly hydrocarbon mixture, which comprises passing a predominantly hydrocarbon mixture containing an organic fluorine compound through a plurality of alternate bodies of copperplated iron and a hydrogen fluoride-sorption medium comprising charcoal and thereafter heating said sorption medium under conditions such that hydrogen fluoride sorbed therein is desorbed therefrom, and recovering free hydrogen fluoride.

11. A process for treating a hydrocarbon material to remove organically combined fluorine therefrom, which comprises subjecting a hydrocarbon material containing a minor proportion of said organically combined fluorine to the action of a catalyst comprising iron which has been etched with sulfuric acid and treated with copper sulfate under conditions to copperplate the iron, removing hydrogen fluoride liberated as a result of contact between said catalyst and hydrocarbon material from a resulting effluent, and recovering a hydrocarbon material substantially free from organically combined fluorine.

JACK F. EBERLE.

(References on following page)

REFERENCES CITED

The following references are of record in the file of this patent:

UNITED STATES PATENTS

| Number | Name | Date |
|---|---|---|
| 1,043,580 | Eldred | Nov. 5, 1912 |
| 1,844,857 | Larson | Feb. 9, 1932 |
| 1,853,771 | Larson | Apr. 12, 1932 |
| 1,869,781 | Shiffler et al. | Aug. 2, 1932 |
| 2,066,697 | Seguy | Jan. 5, 1937 |
| 2,194,186 | Pier et al. | Mar. 19, 1940 |
| 2,267,767 | Thomas | Dec. 30, 1941 |
| 2,333,648 | Grosse et al. | Nov. 9, 1943 |
| 2,333,649 | Grosse et al. | Nov. 9, 1943 |
| 2,341,567 | Moriarity | Feb. 15, 1944 |
| 2,374,819 | Kanhofer et al. | May 1, 1945 |
| 2,377,546 | Frey | June 5, 1945 |
| 2,378,636 | Iverson | June 19, 1945 |
| 2,392,915 | Grosse et al. | Jan. 15, 1946 |
| 2,396,844 | Grosse et al. | Mar. 19, 1946 |
| 2,403,714 | Frey | July 9, 1946 |
| 2,413,868 | Frey | Jan. 7, 1947 |

Certificate of Correction

Patent No. 2,481,207 September 6, 1949

JACK F. EBERLE

It is hereby certified that error appears in the printed specification of the above numbered patent requiring correction as follows:

Column 15, line 69, for the word "with" read *within*;

and that the said Letters Patent should be read with this correction therein that the same may conform to the record of the case in the Patent Office.

Signed and sealed this 18th day of April, A. D. 1950.

[SEAL]

THOMAS F. MURPHY,
*Assistant Commissioner of Patents.*